United States Patent
Köhn et al.

(10) Patent No.: US 11,225,386 B2
(45) Date of Patent: Jan. 18, 2022

(54) METHOD FOR STACKING OF FILLED SACKS TO A PALLET-FREE SACK STACKING

(71) Applicant: Windmöller & Hölscher KG, Lengerich (DE)

(72) Inventors: Uwe Köhn, Osnabrück (DE); Rafael Imberg, Ibbenbüren (DE); Martin Kölker, Ibbenbüren (DE); Rüdiger Große-Heitmeyer, Westerkappeln (DE); Andreas Schrödter, Ladbergen (DE); Thomas Hawighorst, Hasbergen (DE)

(73) Assignee: Windmöller & Hölscher KG, Lengerich (DE)

( * ) Notice: Subject to any disclaimer, the term of this patent is extended or adjusted under 35 U.S.C. 154(b) by 531 days.

(21) Appl. No.: 14/696,500

(22) Filed: Apr. 27, 2015

(65) Prior Publication Data
US 2015/0307290 A1    Oct. 29, 2015

(30) Foreign Application Priority Data
Apr. 28, 2014 (DE) ...................... 10 2014 105 936.0

(51) Int. Cl.
*B65G 57/03* (2006.01)
*B65B 11/02* (2006.01)
(Continued)

(52) U.S. Cl.
CPC ............ *B65G 57/03* (2013.01); *B65B 11/025* (2013.01); *B65B 35/50* (2013.01);
(Continued)

(58) Field of Classification Search
CPC ..... B65B 11/025; B65B 11/585; B65B 35/50; B65B 53/02; B65B 9/135; B65D 19/0002;
(Continued)

(56) References Cited

U.S. PATENT DOCUMENTS 2,869,721 A * 1/1959 Baumer ............. B65D 71/0088
  206/322
2,933,207 A * 4/1960 Edmonds ................ B65B 35/50
  100/2
(Continued)

FOREIGN PATENT DOCUMENTS

DE        2626660 A1 * 12/1977  ........... B65B 11/585
DE        2650214 A1 *  5/1978  ............ B65B 53/02
(Continued)

OTHER PUBLICATIONS

Translation_DE3832557A1—machine translation of DE 3832557 A1.*
(Continued)

*Primary Examiner* — Thomas M Wittenschlaeger
(74) *Attorney, Agent, or Firm* — Rudy J. Ng; Bret E. Field; Bozicevic, Field & Francis LLP

(57) ABSTRACT

The invention relates to a method for stacking of filled sacks (20) to a pallet-free sack stacking (10) comprising the following:
  Performing of a first layer (L1) from at least two rows of filled sacks (20),
  Performing of at least one further layer (L2) from at least two rows of filled sacks (20) on top of the first layer (L1),
  Covering of the completed sack stacking (10) with at least a stabilized cover (30).
The first layer (L1) or the last layer (L9) of the sack stacking with at least two elevating recesses (40) are performed for an elevation with a forklift and between two layers (L8, L9) a mechanically stiffened intermediate space (50) is realized with a floor space (52) which extends between both neighboring layers (L8, L9) and at least a lateral flap (54) which
(Continued)

extends along the lateral side (22) of the sacks (20) of one of both neighboring layers (L8, L9) and transverse to the elevating recesses (40).

8 Claims, 6 Drawing Sheets

(51) Int. Cl.
| | |
|---|---|
| *B65B 35/50* | (2006.01) |
| *B65D 19/00* | (2006.01) |
| *B65G 57/22* | (2006.01) |
| *B65D 71/00* | (2006.01) |
| *B65G 57/24* | (2006.01) |
| *B65G 57/00* | (2006.01) |
| *B65G 57/26* | (2006.01) |

(52) U.S. Cl.
CPC ..... *B65D 19/0002* (2013.01); *B65D 71/0088* (2013.01); *B65G 57/22* (2013.01); *B65G 57/24* (2013.01); *B65D 2571/00018* (2013.01); *B65D 2571/00043* (2013.01); *B65D 2571/00092* (2013.01); *B65G 57/005* (2013.01); *B65G 57/26* (2013.01)

(58) Field of Classification Search
CPC ...... B65D 71/0088; B65D 2571/00018; B65D 2571/00092; B65D 2571/00043; B65D 2571/00012; B65D 2571/00061; B65D 2571/00067; B65D 75/004; B65G 57/22; B65G 57/005; B65G 57/03; B65G 57/24; B65G 57/26
See application file for complete search history.

(56) References Cited

U.S. PATENT DOCUMENTS

| | | | | |
|---|---|---|---|---|
| 2,962,163 A * | 11/1960 | Else | ............... | B65D 71/0088 |
| | | | | 206/322 |
| 3,189,175 A * | 6/1965 | Cruckshank | ....... | B65D 71/0088 |
| | | | | 206/322 |
| 3,298,326 A * | 1/1967 | Addison | ............ | B65D 71/0088 |
| | | | | 206/386 |
| 3,695,426 A * | 10/1972 | Engelsberger | ..... | B65D 71/0088 |
| | | | | 206/497 |
| 3,853,218 A * | 12/1974 | Grasvoll | ................ | B65B 9/026 |
| | | | | 206/497 |
| 3,884,935 A * | 5/1975 | Burns, III | ............ | B65B 53/063 |
| | | | | 206/322 |
| 3,903,673 A * | 9/1975 | Grasvoll | ................ | B65B 9/026 |
| | | | | 53/535 |
| 4,060,957 A * | 12/1977 | Birkenfeld | ............ | B65B 11/585 |
| | | | | 53/170 |
| 5,195,295 A * | 3/1993 | Kurosaki | ........... | B65D 71/0088 |
| | | | | 53/399 |
| 2004/0149619 A1* | 8/2004 | Dybro | .................... | B65D 19/04 |
| | | | | 206/527 |
| 2018/0105298 A1* | 4/2018 | Frenzel | ................. | B65B 11/585 |

FOREIGN PATENT DOCUMENTS

| | | | | | |
|---|---|---|---|---|---|
| DE | | 2916298 | A1 * | 10/1980 | ............ B65B 53/02 |
| DE | | 3832557 | | 4/1990 | |
| DE | | 3832557 | A1 * | 4/1990 | ............ B65B 9/135 |
| DE | | 3941139 | | 6/1991 | |
| DE | | 3941139 | A1 * | 6/1991 | ........... B65B 11/585 |
| DE | | 102009052551 | A1 * | 5/2011 | ............ B65B 9/135 |
| EP | | 1281629 | | 2/2003 | |
| EP | | 1281629 | A1 * | 2/2003 | ............ B65D 57/00 |
| EP | | 2036818 | | 3/2009 | |
| EP | | 2036818 | A1 * | 3/2009 | ............ B65B 9/135 |
| FR | | 2540836 | A1 * | 8/1984 | ......... B65D 71/0088 |
| GB | | 2185461 | | 7/1987 | |
| GB | | 2185461 | A * | 7/1987 | ............ B65D 57/00 |
| WO | | WO 00/71448 | | 11/2000 | |
| WO | | WO 0071448 | A1 * | 11/2000 | ............ B65D 71/70 |

OTHER PUBLICATIONS

Europaeischer Recherchenbericht und die Stellungnahme zur Europaeischen Recherche [European Search Report and the European Search Opinion] dated Sep. 29, 2015 From the European Patent Office Re. Application No. 15156478.8.

Translation Dated Dec. 28, 2015 of Stellungnahme zur Europaeischen Recherche [European Search Opinion] dated Sep. 29, 2015 From the European Patent Office Re. Application No. 15156478.8.

Examination Report dated Sep. 23, 2019 From the Deutsches Patent—und Markenamt Re. Application No. 102014105936.0 and Its Summary in English. (7 Pages).

* cited by examiner

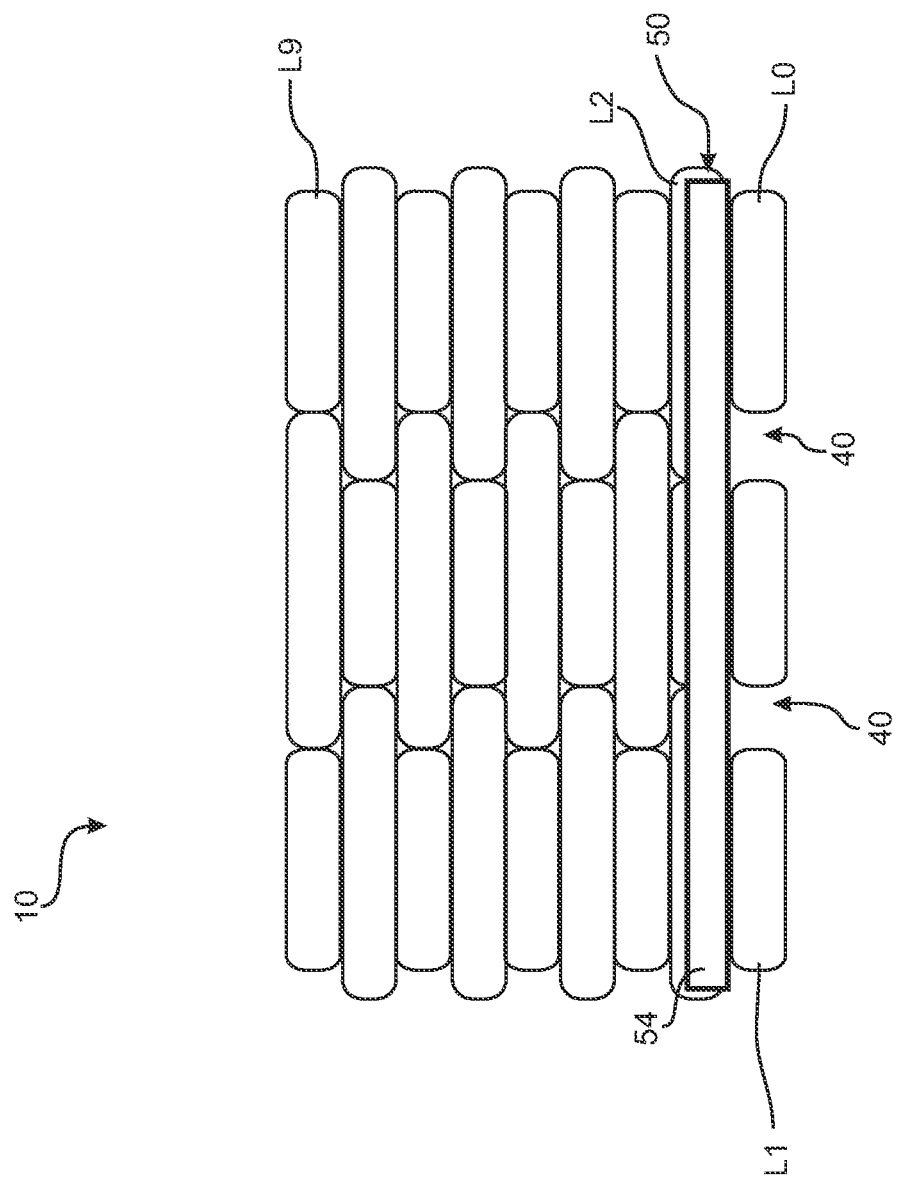

METHOD FOR STACKING OF FILLED SACKS TO A PALLET-FREE SACK STACKING

RELATED APPLICATION

This application claims the benefit of priority of German Patent Application No. 10 2014 105 936.0 filed Apr. 28, 2014, the contents of which are incorporated herein by reference in their entirety.

DESCRIPTION

Background of the Invention

The present invention relates to a method for stacking of filled sacks to a pallet-free sack stacking as well as to a sack stacking produced by the corresponding method.

It is known that for the storage and the transport of filled sacks these should be stacked to sack stackings. Therefore, the sacks are merged in different rows to single layers, wherein these single layers are stacked on top of each other in order to form the sack stacking. Often, such a sack stacking is assembled on a pallet in order to easily and simply perform the transport with a transportation aid like for example a forklift. Further, it is generally known that pallets can be dispensed if the stack itself comprises a sufficient stability. Particularly this is the case, if filled sacks are stacked wherein in the lowermost position at least two elevating recesses for an elevation with a forklift are performed. Thereby the forks of the forklift reach between the filled sacks of the lowermost position, so to say, so that the pallet can be dispensed.

It is a disadvantage with the known solutions that during the use of a pallet accordingly storage space for the filled sacks disappears. If a pallet is dispensed according to the known solutions, this can only occur, when the filled sacks and thereby particularly the filling within the sacks comprise a sufficient mechanical stability in order to dispense with a pallet stabilization. However, this is generally not the case so that this solution can only be applied in special cases. With the most stacking possibilities of filled sacks it has to be reverted to the known solution with the usage of a pallet with the corresponding disadvantages. Beneath the space requirements this pallet also leads to additional cost and can also lead to risks of breaking and thereby to risks of injury within the handling of the pallets by a possible damage of a usual pallet performed from wood.

SUMMARY OF THE INVENTION

It is the object of the present invention to at least partially avoid the previously described disadvantages. Particularly, it is the object of the present invention to provide preferably multiple different stacking forms and especially filling materials of the filled sacks for a pallet-free sack stacking in a cost-efficient and simple manner.

The previous object is solved by a method with the features according to the present disclosure and a sack stacking with the features according to the present disclosure. Further features and details of the invention result from the dependent claims, the description and the drawings. Thereby, the features and details which are described corresponding to the method according to the invention naturally also apply corresponding to the sack stacking according to the invention and vice versa, so that according to the disclosure of the single aspects of the invention, it can always be reciprocally related to.

According to the invention the method serves for stacking of filled sacks to a pallet-free sack stacking. Hereby, the method according to the invention comprises the following:

Performance of a first layer from at least two layers of filled sacks,
Performance of at least another layer from at least two layers of filled sacks on top of the first layer,
Covering of the finished sack stacking with at least a stabilized cover.

With the previous steps it is crucial that the first layer or the last layer of the sack stacking with at least two elevating recesses is performed for an elevation with a forklift. Thereby, a mechanically stiffed intermediate floor is inserted between two layers with a floor space extending between the two neighboring layers and at least a lateral flap which extends along the lateral side of the sacks of one of both neighboring layers and transverse to the elevating recesses.

The method according to the invention thereby serves for stacking of filled sacks in order to reach a pallet-free sack stacking. This pallet-free sack stacking should be possible particularly independently of the filling and/or the material of the filled sacks. This is achieved by the fact that on the one hand a stabilized cover for the finished sack stacking is used. Under a stabilized cover a foil cover is particularly understood, which can perform a cover force to the finished sack stacking. Such a foil cover can for example be wrapped or shrunk in order to hold the finished sack stacking together from the side and from the top and underneath. The stabilized cover can thereby be performed in one piece or in multiple pieces so that particularly from different sides or with different wrapping directions with a shrinking film the desired stabilized effect can be achieved with the cover.

By an elevating recess according to the invention recesses are understood in which the forks of the forklift can at least partially engage. Since the forklift is normally shaped with extending forks in longitudinal direction, it is according to the invention that both elevating recesses are also performed with a longitudinal free diameter in which these forks can engage. If, for example, the filled sacks are laying on their broad sides in the different layers, so a recess can be intended between the single lateral sides which extends at least laterally to a part of the finished sack stacking. Thereby the elevating recesses according to the invention are performed.

In order to achieve a possibly high mechanical stability during the elevation of the finished pallet-free sack stacking with the forklift, it is according to the invention to provide the mechanical stiffened intermediate floor. This particularly serves for avoiding or at least reducing of sagging between the single forks and the there assembled filled sacks. Therefore the mechanically stiffened intermediate floor is performed from a material which is provided possibly cost efficient. For the mechanically stiffened performance not mainly the material, but the correlation between the floor space and the lateral flap is important.

The floor space of the intermediate floor thereby extends between the two neighboring layers. Thereby it can be preferred if the whole or the mainly whole corresponding layer is covered with such a floor space. However, it can also be sufficient if only a part of this area between two neighboring layers of the floor space is covered. The lateral flap is so to say bended from the floor flap, particularly about a bending angle of approximately 90°. In this manner the lateral flap extends along the bended line and also along the lateral side of the sacks of one of both neighboring layers.

Are for example the elevating recesses assembled in the lowermost layer and is the floor space of the mechanically stiffened intermediate space between the lowermost layer and the second lowest layer intended, the lateral flap can extend downwards and also upwards. It is preferred when the lateral flap extends along the lateral side of the sacks of the second lowest layer that the elevating recesses in this manner are without engagement automatically independent from the geometrically extension of the lateral layers.

If now the forklift elevates a produced pallet-free sack stacking according to the invention, the weight of the filled sacks leads to a force effect downwards. While with the known pallet-free sack stacking this leads to a sagging or a deflection between the forks of the forklift, here the correlation between the floor space and the lateral sides, particularly by the bend edge between these two elements of the intermediate floor, leads to a significant stabilization. The weight stabilizes thereby via the lateral flap or the bend edge and the floor space to the side and can be correspondingly better inserted in the forks of the fork lift. A sagging or a deflection between the forks of the forklift and thereby between the elevating recesses is increasingly reduced or even completely avoided.

By a layer according to the invention particularly a performance of a certain assembly form of a plurality of sacks is understood. Thereby it is preferred, when the performance form or the overview of the single layers differentiate in order to increase the mechanical stability of the sack stacking in this manner.

The method according to the invention is particularly performed with a pallet device. Such a pallet device serves also for the assembly of usually filled sacks on a pallet. However, by a simple leave-out of the pallet with such a device also a method according to the invention can be performed. So a corresponding lifting device is performed simply directly to the first layer from at least two rows of filled sacks. Herefore, normally an overview of a pushing surface in a pushing device is produced which subsequently is pushed to a neighboring sliding table with the help of a pusher. This sliding table can open, so that the completed layer can be drawn to the pallet underneath or with a method according to the invention directly to a lifting device assembled underneath. Subsequently, the lifting device moves downwards about the width of a filled sack or the width of the layer, so that the sliding table can close again. This process is repeated so often until all layers and thereby the desired staple height of the sack stacking is achieved. In order to perform the method according to the invention thereby a mechanically stiffened intermediate floor can be inserted between two layers, for example directly using the pushing device and the opened sliding table. However, it is also possible that in a manual manner or by a lateral supplying device a corresponding intermediate floor is inserted before the following layer is drawn from above to the floor space of the intermediate floor.

According to the invention the intermediate floor can comprise a folding which provides the flap edge between the floor space on the one hand and the lateral flap on the other hand. However, it is also possible that the mechanically stiffened intermediate floor is intended as a simple and even extension so that not before a covering of the completed sack stacking with the at least one stabilized cover automatically a part of the intermediate floor is turned by the effect of the previously described covering force. Thereby, a flap line results between the lateral flap and the floor space so to say automatically by this cover.

It has to be pointed out that in the first layer and also in the last layer of the sack stacking corresponding elevating recesses are intended. If they are configured in the first and thereby lowermost layer during the stacking process, a directly subsequent further transport can occur. If in the uppermost and thereby last layer the particular elevating recess is configured a performance of the lowermost layer to the uppermost layer can occur by a complete turn or reassembly of the completed sack stacking after the covering step. Both variants comprise the same advantages within the present invention.

It can be an advantage, if the method according to the invention intends the elevating recesses in the last layer of the sack stacking and subsequently to the step of the covering the covered sack stacking is turned so that the last layer configures the lowermost layer of the sack stacking. Although this leads to an additional method step, however, during the performance of the stacking process also to a higher stability. So during the stacking the first layer can be shaped completely filled so that the possibly destabilizing elevating recesses have no influence on the above stacked layers. For the turning a corresponding rotation gripper can be intended, which subsequent to the step of the covering can pick and turn an interstabilized sack stacking with corresponding sufficient stability. During the turning the cover as well as the stabilized effect of the intermediate space keep the completed sack stacking in its desired form.

Another advantage is achievable when with a method according to the invention the intermediate space between the layer in which the elevating recess is intended and the neighboring layer is inserted. In other words, the distance between the intermediate floor and the elevating recess is minimized. While the stiffening effect described according to the invention is advantageous for each assembly of the intermediate space, by the compactness of the complete sack stacking with the help of the covering this advantageous function is further increased by the direct vicinity between the intermediate floor and the elevating recess. The stiffening effect with the help of the intermediate floor effects in the direct vicinity of the elevating recess even more direct, so that correspondingly the sagging or bending of the lowermost layer between the elevating recesses can be more effectively avoided. Particularly, the intermediate floor can during the performance of the first layer or the second to last layer be directly introduced like it has been described for several times.

It is also an advantage if during the method according to the invention the intermediate floor comprises two lateral flaps which extend along the lateral side of the sacks on different sides of the sack stacking transverse to the elevating recesses. With other words the intermediate floor is now intended with a floor space and two lateral flaps which are bended on different sides of the sack stacking. Thereby, two bend lines are performed which run particularly with a box-like sack stacking parallel or mainly parallel towards one another. Thereby, both bend lines run perpendicular or mainly perpendicular to the respective elevating recess. The described stiffening effect is further increased by the doubled lateral flap and thereby the doubled performance of the corresponding bend line and particularly even doubled. With a relation to the driving direction of a forklift, thereby the stiffening bend line by both lateral flaps is assembled on the front side and also on the rear side.

It is another advantage when with a method according to the invention the at least one lateral flap comprises a width which corresponds or mainly corresponds to the width of a lateral side of a filled sack. Correspondingly, the lateral flap is sufficiently big dimensioned that between the surface of the lateral flap and the surface of the lateral side of the filled sack a friction is performed which is particularly increased by the influence of the covering force. Thereby it is avoided that by mechanical influence to the sack stacking the lateral flap is inserted in an undesired manner along the floor space between both layers. Such a case has to be avoided since otherwise the described stabilizing effect is reduced or even completely cancelled. The performance in this width further leads to the fact that on the lateral flaps a print can be intended which shows information concerning the intermediate floor and/or the filled sacks. Particularly, in combination with transparent covers, this leads to a further reduction of transport effort or handling effort.

It is another advantage when with a method according to the invention a lateral flap extends along the lateral side of the sacks and away from the elevating recesses. This means that in the elevated position the lateral flap extends so to say upwards. Thereby, the particular elevating recess is always free independent from the geometric extension and thereby the size of the lateral flap. In this manner the lateral flap can be particularly big and extend particularly over the complete width of the lateral side of a filled sack and also over the complete length of the corresponding layer. In the same manner, so to say the maximum stiffening effect is achieved without affecting the elevation via the elevating recesses.

It is further an advantage when with the method according to the invention the intermediate space comprises at least one of the following materials and/or is at least partially formed of the following materials:
  paper
  cardboard
  carton
  plastic.

The previous counting it is a non-completed list. Correspondingly also combinations of the different materials or with other materials are possible. So for example the uppermost paper layer can be connected to a lowermost paper layer via a corrugated cardboard carton in order to provide corresponding strengthening structures, for example in form of combs or triangles. Naturally, also material mixtures can be intended over geometrically different sections of the intermediate floor. Particularly the already multiple times described edge or bend edge between the lateral flap and the floor space can thereby comprise a corresponding material selection in order to increase this bending functionality.

It is a further advantage when with a method according to the invention with at least two covers, particularly from different sides, the completed sack stacking is covered. Such a cover can for example be put up from the top and correspondingly also via a shrinking of a first covering force. Subsequently the completed sack stacking can be turned so that a second cover from the top and thereby from the other side of the sack stacking provides the complete cover structure. Also the application of a so called stretch film is possible, so that a so called lateral wrapping is possible. This shows that the cover can be performed in different manners in order to ensure the functionality according to the invention in combination with the mechanically stiffened intermediate floor.

It is also an advantage when with a method according to the invention at least two intermediate floors particularly in the same or in mainly the same shape are intended between each two different layers. This leads to the fact that a further increased mechanical stability is possible. Each of the intermediate floors particularly comprises the same or mainly the same performance, particularly concerning the assembly, shape and direction of the floor space and the lateral flaps. This leads to an increasing of the stability function also with not neighboring interspaces.

It is also an advantage when with a method according to the invention the insertion of the intermediate floor occurs between two steps of the performance of both neighboring layers of sacks. So the intermediate floor can during the stacking be handled like a distinct layer. Particularly this occurs with the help of a pallet device or a therein assembled corresponding pushing device like this was already described. Also a pushing during the performance of the layers from the side is thereby possible according to the invention.

Also an embodiment of the present invention is a sack stacking comprising at least two layers with each at least two rows of filled sacks, wherein the lowermost layer comprises at least two elevating recesses for the elevation of a forklift. Between two layers a mechanically stiffened intermediate space is assembled with a floor space extending between the two neighboring layers and at least a lateral flap extending along the lateral sides of the sacks of one of both neighboring layers and transverse to the elevating recesses. Particularly a sack stacking according to the invention is performed with a method according to the invention. Thereby the sack stacking according to the invention provides the same advantages like described in detail for the method according to the invention.

BRIEF DESCRIPTION OF THE DRAWINGS

Further advantages, features and details of the invention result from the following description, in which with reference to the drawings embodiments of the invention are described in detail. Thereby, the features described in the claims and in the description can be each single or in every combination be essential for the invention. It is shown:

DESCRIPTION OF SPECIFIC EMBODIMENTS OF THE INVENTION

On the basis of FIGS. 1 to 7 the method according to the invention can be described. So a lifting device which is provided with transport rolls can be moved downwards starting from the top in course of the method along the direction of the arrow. Schematically, also a sliding table of a not described pushing device is shown, which can perform an opening movement along both arrow directions in FIG. 1. On this pushing table a layer L is performed from sacks 20, which comprise a corresponding overview. By the opening of the sliding table the respective layer L, in FIG. 1 layer 2 reaches the layer L1 underneath which is already on the lifting device.

Like it is shown in the figures with this embodiment a variation of the corresponding overview is intended. For a higher mechanical autostability of the to be performed sack stacking 10 this leads to an interlacing of the filled sacks 20 from layer L to layer L.

Figure 1:
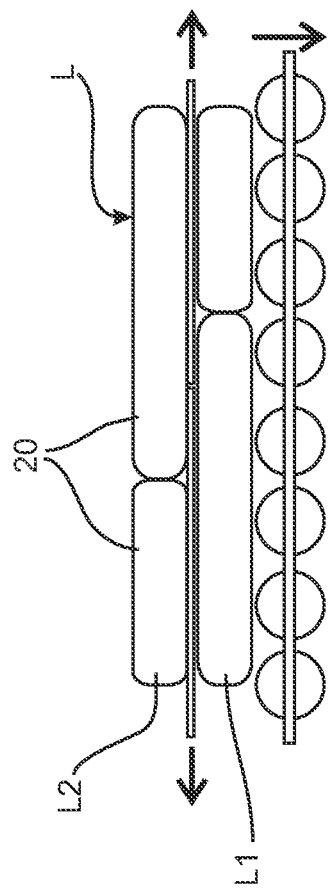
FIG. 1 a first method step of a method according to the invention.
Figure 2:
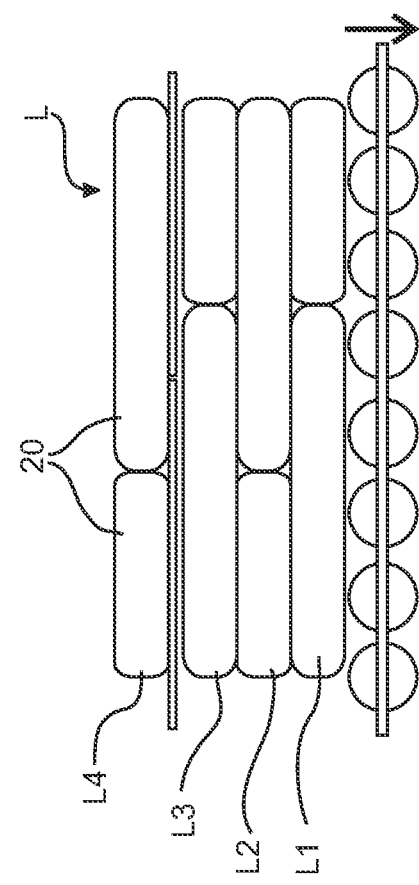
FIG. 2 a further method step of a method according to the invention.
Figure 3:
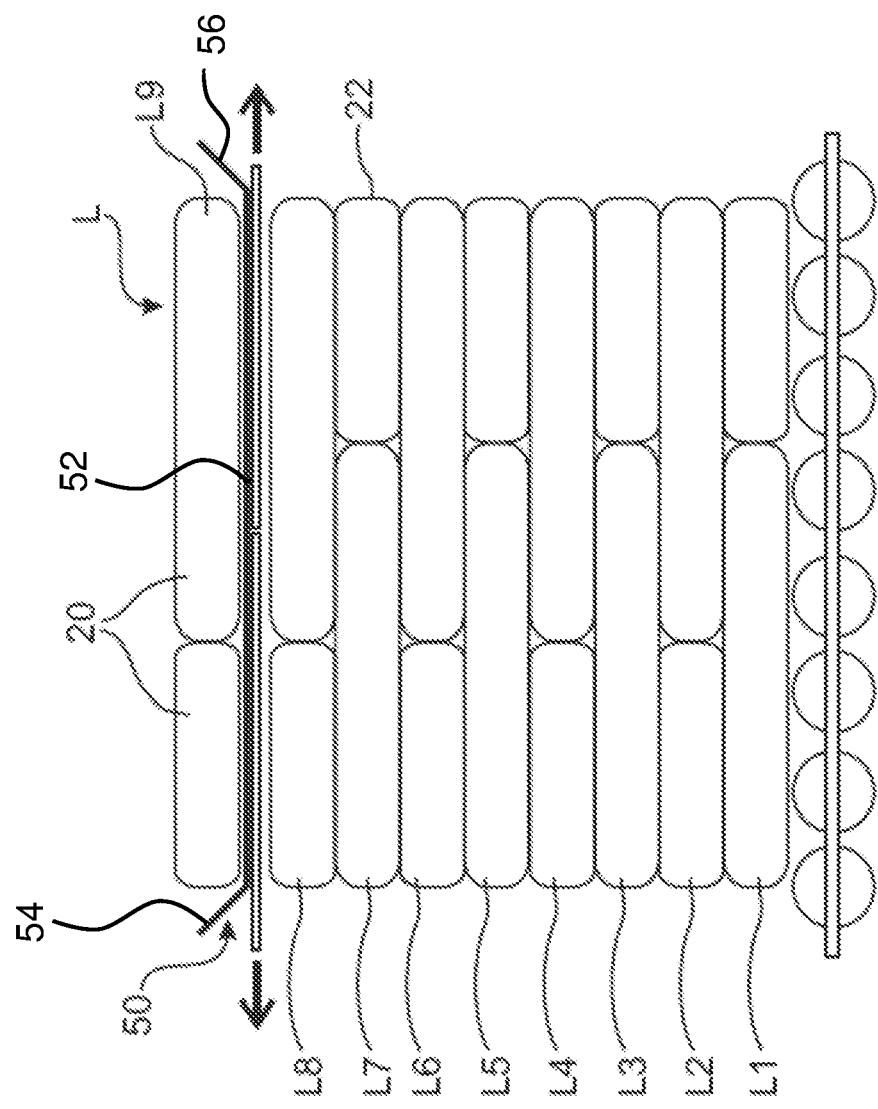
FIG. 3 the performance of the last layer of a method according to the invention, FIG. 4 the step of covering with a method according to the invention, FIG. 5 an optional step of turning of a method according to the invention, FIG. 6 a completed sack stacking according to the invention in a first view, FIG. 7 the stacking according to FIG. 6 in a lateral view and FIG. 8 another embodiment of a sack stacking according to the invention.

FIG. 2 shows the situation during the performance of the forth layer L4 on the layers underneath L 1, L2 and L3. In FIG. 3 the performing of the last layer L9 to the layer 8 underneath is shown. It can be seen that already on the sliding table of this sliding device an intermediate floor 50, which includes a floor space 52, a first lateral flap 54 and a second lateral flap 56, is performed which is underneath the last layer L9. If now the sliding table is opened this uppermost layer L9 attains together with the intermediate floor 50 to the second uppermost layer L8 which builds the complete sack stacking 10 with the layers underneath L7, L6, L5, L4, L3, L2 and L 1.

Figure 4:
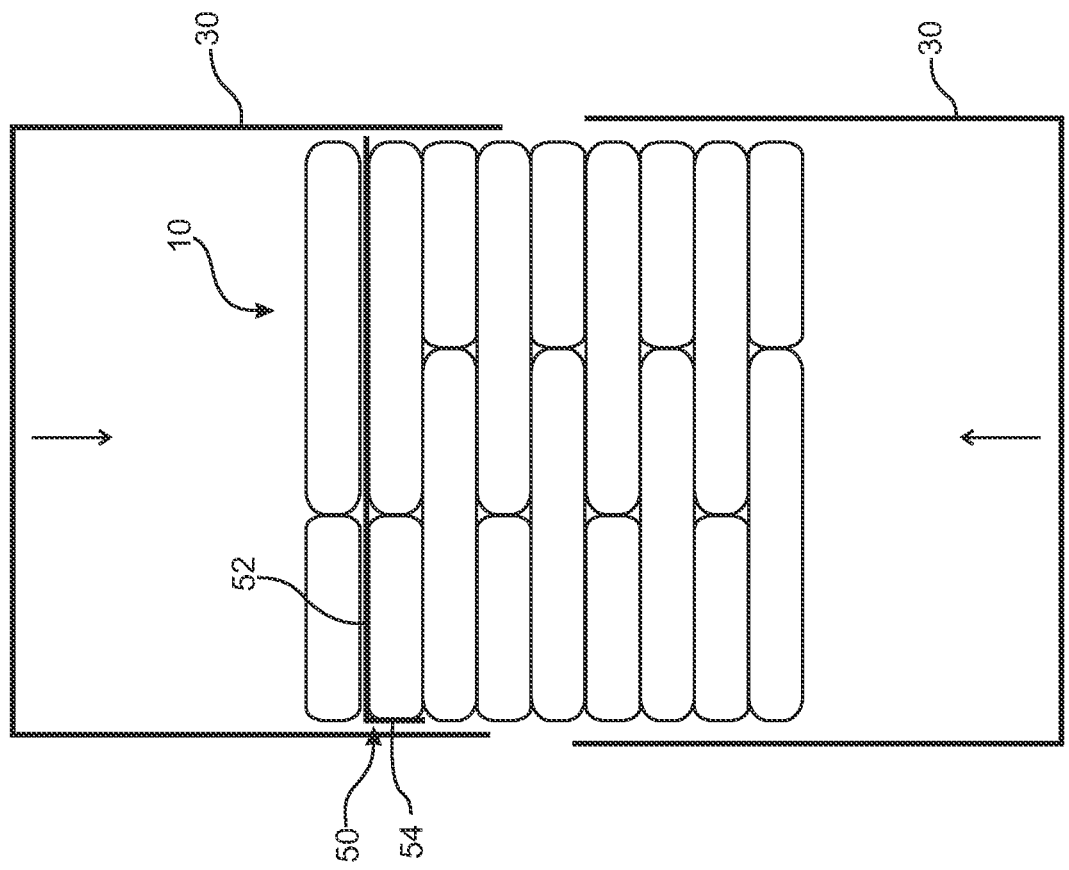
Figure 5:
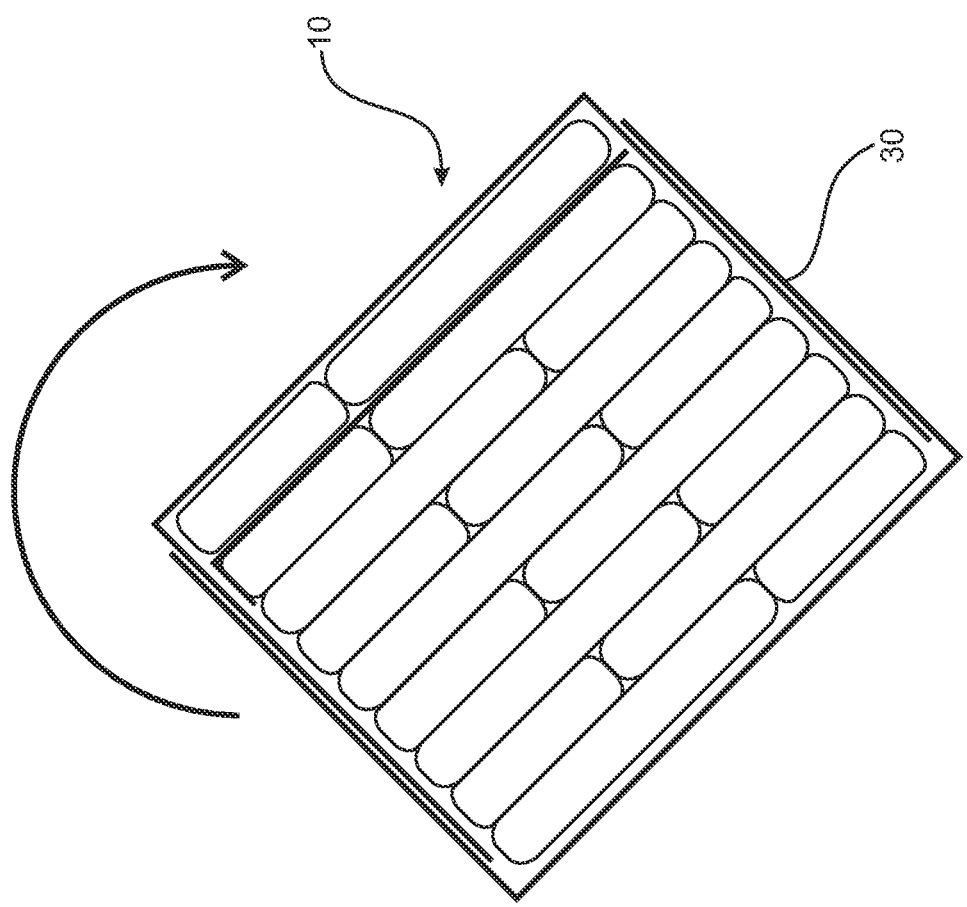
Figure 7:
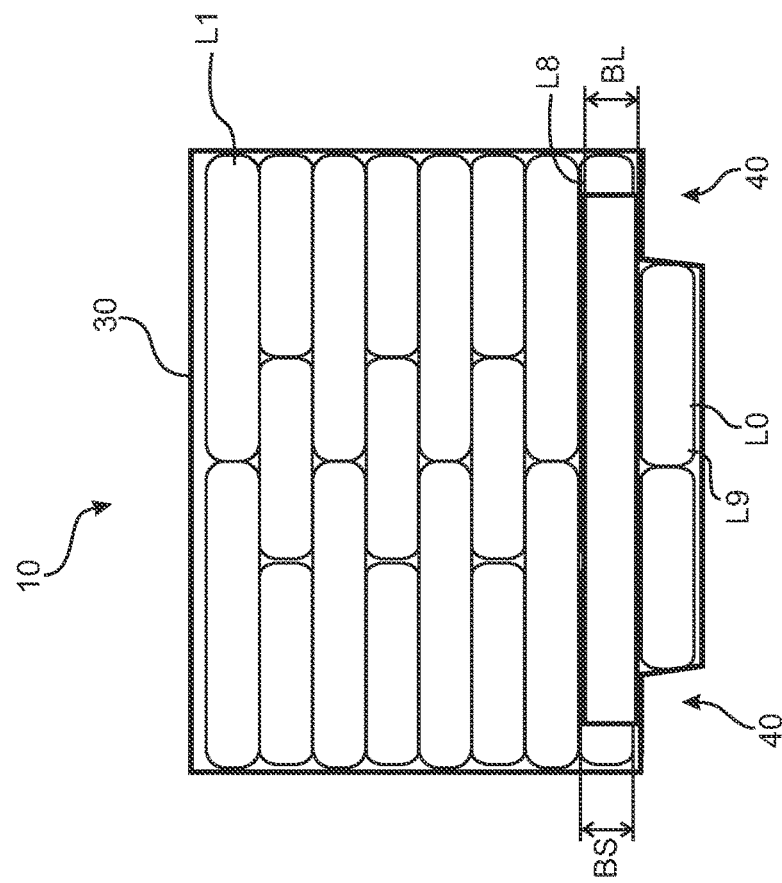
Figure 6:
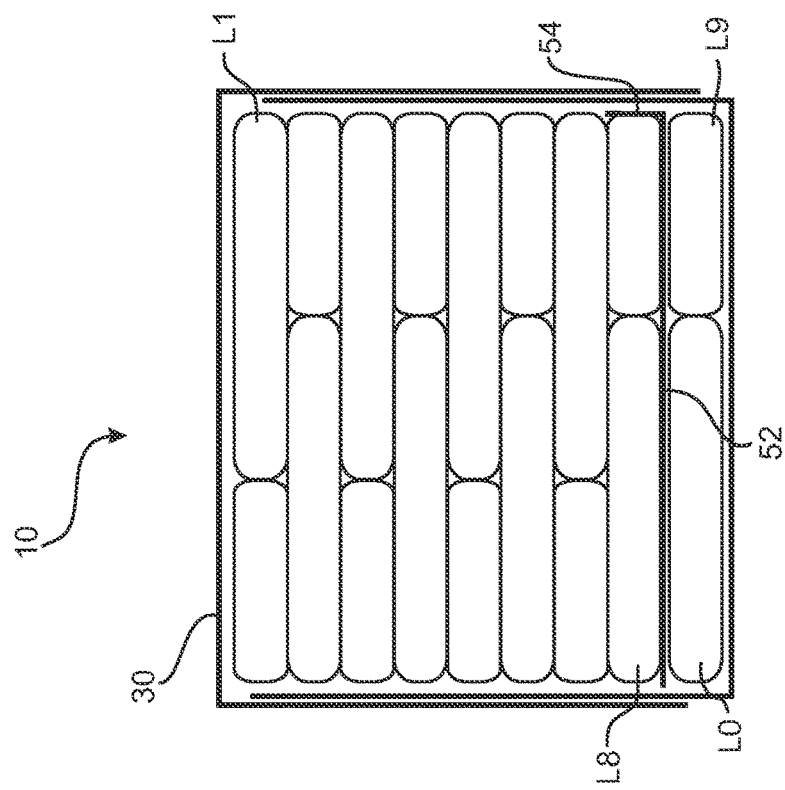

FIG. 4 shows that particularly from two different sides a cover 30 can be performed. By the assembly of this cover 30 at the same time a turning of the lateral flap 54 of the intermediate floor 50 occurs so that a bend edge between the lateral flap 54 and the floor space 52 is performed like one can clearly recognize. The cover 30 which is particularly transparent is for example a shrinking film which can perform a corresponding covering force to the sack stacking 10. With the embodiment of this method according to FIG. 1 to 4 elevating recesses 40 like subsequently shown in FIG. 7 are performed in the last layer L9. Correspondingly, a rotational step occurs in order to turn the uppermost and last layer L9 into the undermost layer L0 like this is shown in the result of this rotation in FIG. 6. In order to better describe the elevating recesses 40 and the corresponding mechanically stiffened functionality of the intermediate floor 50, FIG. 7 shows a view of FIG. 6 from the right side. So here in both external sides elevating recesses 40 are intended in which corresponding forks of a forklift can engage. If now these forks in the elevating recesses 40 elevate the sack stacking 10, the elevation force is introduced in Layer L8. The complete weight of all layers L1 to L8 above are leaning also at these two external sides via the contact area of the elevating recesses 40 to the forks of the forklift. The weight in between, which particularly also includes the assembly of the balance points, is directed to the outside via the bend line between the lateral flap 54 and the floor space 52 so that an undesired bagging or flapping is significantly reduced. Thereby in this embodiment the width BL of the lateral flap 54 has a similar size or the same size as the width BS of the corresponding sacks 20 in this layer L8.

FIG. 8 shows a variation of a sack stacking 10 according to the invention which is performed by similar or the same method steps with the method according to the invention. Here, it can be clearly seen in the lateral view that the elevating recesses 40 are not necessarily assembled at the external side of the sack stacking 10. It can also be recognized that the lowermost layer L0 is performed by the first layer L1. Thereby a corresponding rotation step does not need to be performed, but can be omitted.

The previous description of the embodiments describes the present invention only within the scope of examples. Naturally also single features of the embodiments as far as technically meaningful can be freely combined with one another without leaving the scope of the present invention.

REFERENCE LIST

10 Sack stacking
20 Filled sack
22 Lateral side
30 Cover
40 Elevating recess
50 Intermediate floor
52 Floor space
54 Lateral flap
L Layer
L1 First layer
L2 Second layer
L3 Third layer
L4 Fourth layer
L5 Fifth layer
L6 Sixth layer
L7 Seventh layer
L8 Eighth layer
L9 Ninth layer
L0 Undermost layer
BL Width of the lateral flap
BS Width of the sack

What is claimed is:

1. Method for stacking of filled sacks to a pallet-free sack stack comprising the following:
    Forming of a first layer from at least two rows of filled sacks,
    Forming of at least one further layer from at least two rows of filled sacks on top of the first layer, and
    Covering of the completed sack stack with at least a stabilizing cover,
    wherein
    the first layer or a last layer of the sack stack comprise at least two recesses formed to engage a forklift for elevation, and a stiff intermediate insert is inserted between said at least two recesses and a layer neighboring said recesses in said sack stack, said stiff intermediate insert comprising one member selected from the group consisting of paper, corrugated cardboard carton and plastic, said stiff intermediate insert consisting of a floor space, a first lateral flap and a second lateral flap, said stiff intermediate insert has a fold to provide the first lateral flap, the first lateral flap having a length and a height, the length being a principle direction of extension, said length and said fold being along a first lateral side of the sacks of one of two neighboring ones of said layers and transverse to a fork insert direction of the at least two recesses, the first lateral side being the side of the stack into which fork insertion is carried out, the height being equal to a height of one layer of said filled stacks, the first lateral flap providing a one of said sacks directly over one of said recesses with support perpendicular to an axis of said fork insert direction, said first lateral flap additionally providing support against outward deformation of said sack along said fork insert direction, the method further comprising providing the second lateral flap by folding said stiff intermediate insert on a second, opposing, lateral side of said stack, the first and second lateral flaps thereby providing stiffening to said stiff intermediate insert to support said stack for said elevation.

2. Method according to claim 1,
    wherein
    the at least two elevating recesses are formed in the last layer of the sack stack and subsequent to said covering, the covered sack stack is turned, so that the last layer forms the undermost layer of the sack stack.

3. Method according to claim 1,
    wherein at least one of said lateral flaps comprises a width which corresponds to the width of a lateral side of a filled sack, such that when folded, the lateral flap covers a portion of the lateral side of a filled sack.

4. Method according to claim 1, wherein
at least one of said lateral flaps extends along the lateral side of the sacks and away from the elevating recesses.

5. Method according to claim 1, wherein
at least two covers cover the completed sack stack.

6. Method according to claim 5, wherein
said at least two covers are from different sides respectively.

7. Method according to claim 1, wherein
at least two intermediate layers are inserted between said first layer and said at least one further layer of the sack stack.

8. Method according to claim 7, wherein said at least two intermediate layers are of a same construction.

* * * * *